United States Patent
Smith et al.

(10) Patent No.: US 7,982,996 B2
(45) Date of Patent: Jul. 19, 2011

(54) PERPENDICULAR MAGNETIC RECORDING WRITE HEAD AND SYSTEM WITH IMPROVED SPIN TORQUE OSCILLATOR FOR MICROWAVE-ASSISTED MAGNETIC RECORDING

(75) Inventors: Neil Smith, San Jose, CA (US); Petrus Antonius VanDerHeijden, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 23 days.

(21) Appl. No.: 12/632,787

(22) Filed: Dec. 7, 2009

(65) Prior Publication Data

US 2011/0134561 A1    Jun. 9, 2011

(51) Int. Cl.
    *G11B 5/02*    (2006.01)
(52) U.S. Cl. .......................... 360/59; 360/324.2
(58) Field of Classification Search .................. None
    See application file for complete search history.

(56) References Cited

U.S. PATENT DOCUMENTS

| | | | |
|---|---|---|---|
| 6,785,092 B2 | 8/2004 | Covington et al. | |
| 7,616,412 B2 * | 11/2009 | Zhu et al. | 360/324.2 |
| 2008/0019040 A1 | 1/2008 | Zhu et al. | |
| 2008/0137224 A1 | 6/2008 | Gao et al. | |
| 2009/0052095 A1 | 2/2009 | Yamada et al. | |
| 2009/0059418 A1 | 3/2009 | Takeo et al. | |
| 2009/0059423 A1 | 3/2009 | Yamada et al. | |
| 2009/0080106 A1 | 3/2009 | Shimizu et al. | |
| 2009/0097167 A1 | 4/2009 | Sato et al. | |

OTHER PUBLICATIONS

Zhu, J. G. et al., "Microwave assisted recording", IEEE Trans. Mag. (2008), pp. 125-131.
Kittel C., "On the Theory of Ferromagnetic Resonance Absorption", Phys. Rev. 73, p. 155-161 (1948).
Zhu, X. et al., "Bias-Field-Free Microwave Oscillator Driven by Perpendicularly Polarized Spin Current", IEEE Transactions on Magnetics, vol. 42, No. 10, Oct. 2006, pp. 2670-2672.

* cited by examiner

*Primary Examiner* — Jason C Olson
(74) *Attorney, Agent, or Firm* — Thomas R. Berthold

(57) ABSTRACT

A microwave-assisted magnetic recording (MAMR) write head and system has a spin-torque oscillator (STO) located between the write pole of the write head and a trailing shield that alters the write field from the write pole. The STO is a stack of layers whose planes lie generally parallel to the X-Y plane of an X-Y-Z coordinate system, the stack including a ferromagnetic polarizer layer, a free ferromagnetic layer, and a nonmagnetic electrically conductive spacer between the polarizer layer and the free layer. In the presence of the write field from the write pole the polarizer layer has its magnetization oriented at an angle between 20 and 80 degrees, preferably between 30 and 70 degrees, with the Z-axis. In the presence of a direct electrical current through the STO stack, the free layer magnetization rotates or precesses about the Z-axis with a non-zero angle to the Z-axis.

27 Claims, 13 Drawing Sheets

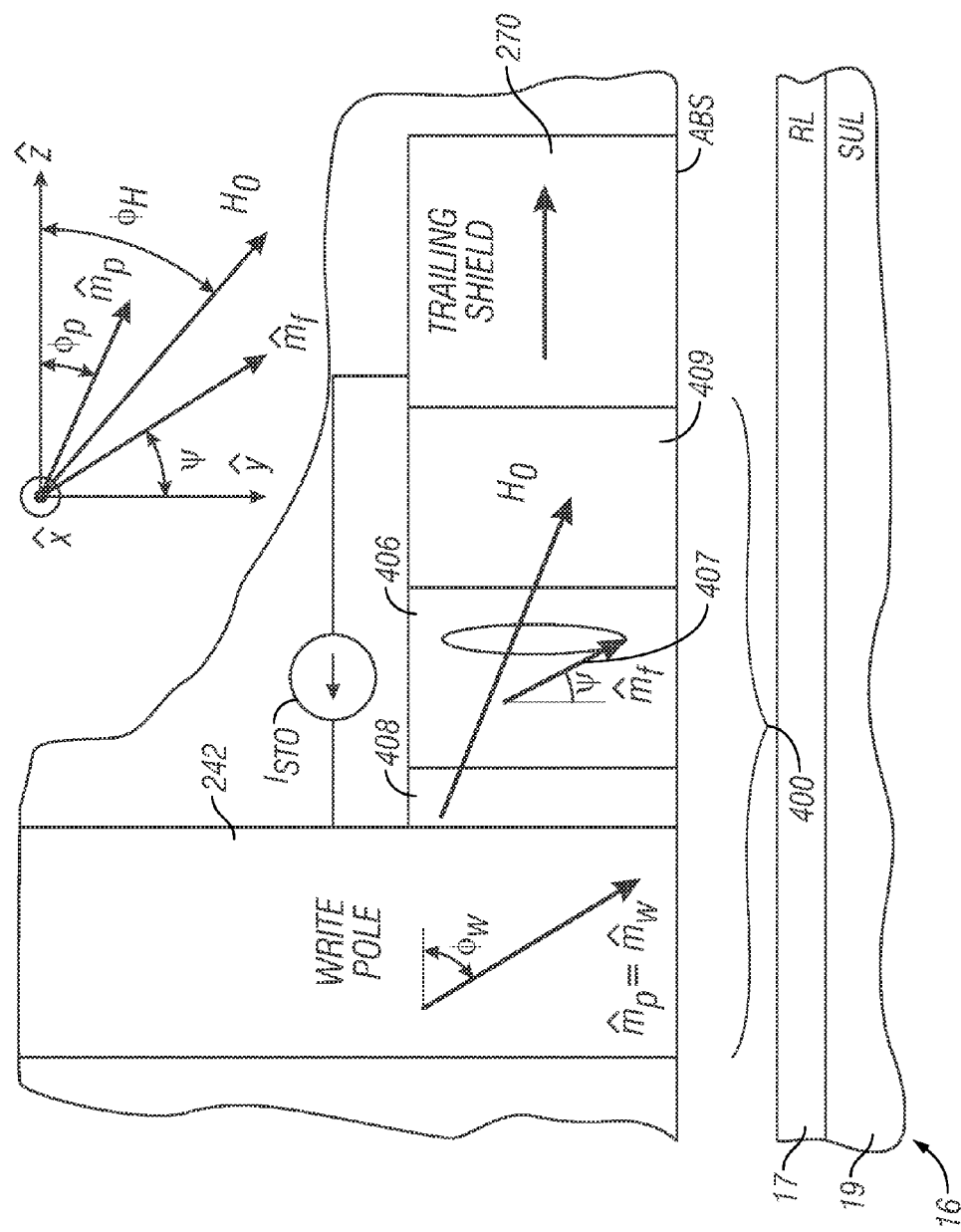

PERPENDICULAR MAGNETIC RECORDING WRITE HEAD AND SYSTEM WITH IMPROVED SPIN TORQUE OSCILLATOR FOR MICROWAVE-ASSISTED MAGNETIC RECORDING

BACKGROUND OF THE INVENTION

1. Field of the Invention

This invention relates generally to perpendicular magnetic recording (PMR) systems, and more particularly to a PMR system with a spin-torque oscillator (STO) that provides microwave-assisted magnetic recording (MAMR).

2. Description of the Related Art

Perpendicular magnetic recording (PMR) in magnetic recording hard disk drives, wherein the recorded bits are stored in a perpendicular or out-of-plane orientation in the magnetic recording layer of the disk, allows for ultra-high recording density, i.e., the areal density of the recorded bits on the disk. However, an increase in recording density requires a corresponding reduction in the size of the magnetic grains in the magnetic recording layer to achieve sufficient medium signal-to-noise ratio. As the size of the magnetic grains is reduced, the magneto crystalline anisotropy of the magnetic grains must be increased to maintain adequate thermal stability. Simultaneously, the magnetic write field from the write head has to exceed the coercivity of the magnetic recording layer to achieve saturation digital recording, resulting in a conflicted limitation on the anisotropy of the magnetic grains.

A PMR system with high-frequency assisted writing using a spin-torque oscillator (STO) has been proposed. This type of recording, also called microwave-assisted magnetic recording (MAMR), applies a high frequency oscillatory auxiliary magnetic field from the STO to the magnetic grains of the recording layer. The auxiliary field may have a frequency close to the resonance frequency of the magnetic grains in the recording layer to facilitate the switching of the magnetization of the grains at lower write fields from the conventional write head than would otherwise be possible without assisted recording. Conversely, MAMR may be used to increase the coercivity of the magnetic recording layer above that which could be written to by a conventional PMR alone. The increase in coercivity afforded by MAMR allows for a reduction in the size of the magnetic grains and thus a corresponding increase in recording density system. MAMR systems are described in U.S. Pat. No. 6,785,092 B2; US 2008/0137224 A1; and by J. G. Zhu et al., "Microwave Assisted Magnetic Recording", *IEEE Transactions on Magnetics*, Vol. 44, No. 1, January 2008, pp. 125-131.

In the previously proposed MAMR systems, the STO is located between the write pole and the trailing magnetic shield of the PMR write head. The STO is a multilayer film stack made up of two or more magnetic layers separated by a nonmagnetic spacer layer. One of the magnetic layers, the free layer, is designed to have its magnetization orientation oscillate in the presence of a direct electrical current perpendicular to the film planes of the film stack. In the presence of current above a critical current density, another magnetic layer, whose magnetization orientation preferably does not oscillate, acts as the "spin-polarizer" to produce a spin-polarized current at the free layer. This destabilizes the static equilibrium of the free layer's magnetization orientation, causing it to undergo sustained oscillation at frequencies useful for MAMR applications. The location of the STO between the write pole and the trailing shield may be the optimal location, if not the only possible location, to produce the necessary auxiliary field at the region of the recording layer where the write field from the PMR write head is applied. However, this location also means that the STO must be able to operate in the presence of the very large magnetic fields generated by the PMR write head. Previous STO designs, and numerical modeling of STOs, do not adequately account for the very large magnetic fields generated by the PMR write head.

What is needed is a PMR system with a STO for MAMR that is located between the write pole and the trailing shield and that operates optimally in the presence of the very large magnetic fields generated by the PMR write head.

SUMMARY OF THE INVENTION

The invention relates to a microwave-assisted magnetic recording (MAMR) write head and system with a spin-torque oscillator (STO) located between the write pole of the write head and a trailing shield that alters the write field from the write pole. The STO is a stack of layers whose planes lie generally parallel to the X-Y plane of an X-Y-Z coordinate system, the stack including a ferromagnetic polarizer layer, a free ferromagnetic layer, and a nonmagnetic electrically conductive spacer between the polarizer layer and the free layer. In the presence of the write field from the write pole the polarizer layer has its magnetization oriented at an angle between 20 and 80 degrees, preferably between 30 and 70 degrees, with the Z-axis. In the presence of a direct electrical current through the STO stack, the free layer magnetization rotates or precesses about the Z-axis with a non-zero angle to the Z-axis. The direct current transfers spin angular momentum from the polarizer layer to the free layer to induce precession of the magnetization of the free layer.

The polarizer layer can be formed solely from a soft magnetic material with properties to enable its magnetization to be maintained at a substantial angle to the Z-axis. The composition, thickness, shape and saturation magnetization of the polarizer layer are selected such that in the presence of the write field the polarizer layer will have a magnetization oriented at the desired angle to the Z-axis.

The polarizer layer may be located between the write pole and the free layer or between the free layer and the trailing shield. The polarizer may be exchange coupled to the write pole or exchange coupled to the trailing shield. In alternative embodiments the write pole or the trailing shield may function as the polarizer layer, in which case a separate polarizer layer is not required. The STO may include separate electrode layers between the write pole and the trailing shield, or the write pole and the trailing shield may function as electrodes for connection to circuitry that supplies the direct current to the STO.

For a fuller understanding of the nature and advantages of the present invention, reference should be made to the following detailed description taken together with the accompanying figures.

BRIEF DESCRIPTION OF THE DRAWING

FIG. 8 shows an embodiment of the invention where the STO polarizer layer is the write pole with magnetization $m_w$, at a non-zero angle with the Z-axis.

DETAILED DESCRIPTION OF THE INVENTION

Figure 1:
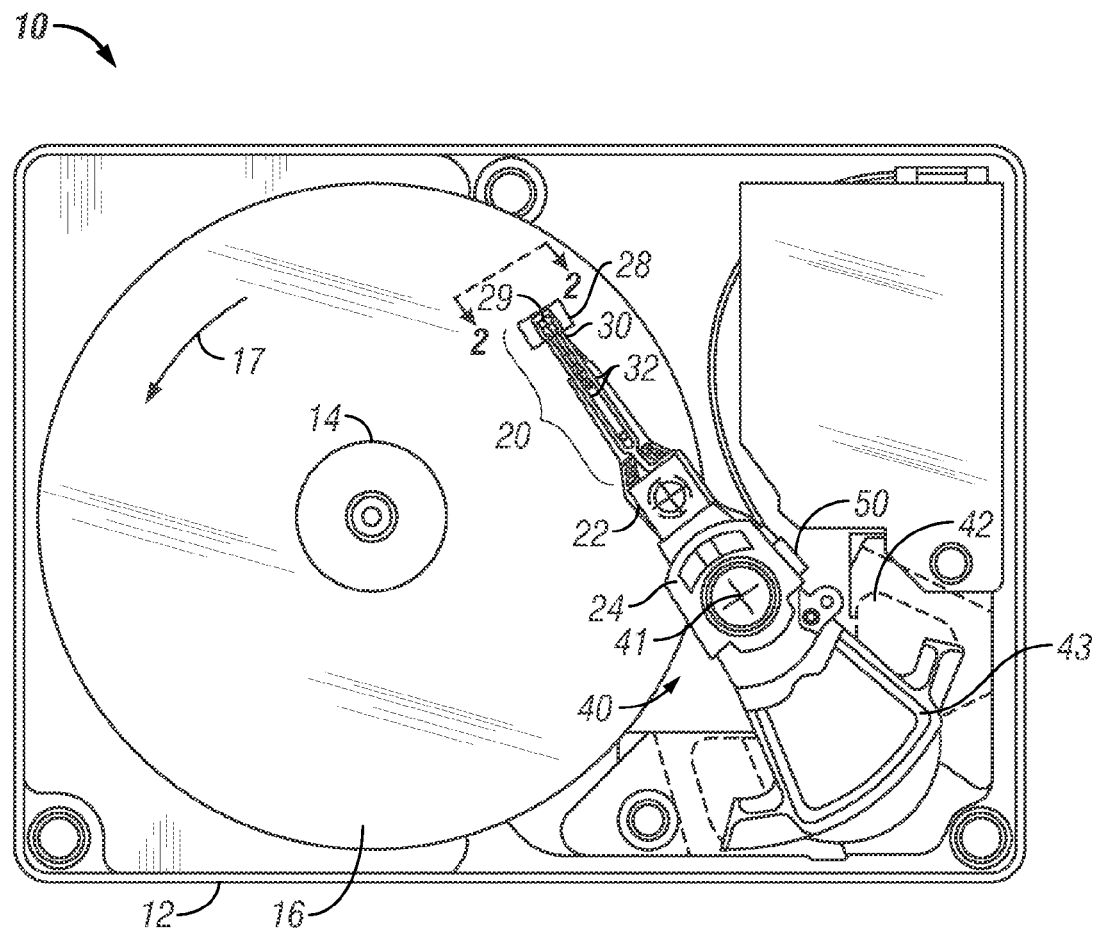
FIG. 1 is a top plan view of a conventional head/disk assembly of a hard disk drive with the cover removed.

FIG. 1 is a top plan view of a conventional head/disk assembly of a hard disk drive 10 with the cover removed. The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E-block 24. Each flexure 30 is attached to an air-bearing slider 28. A magnetic recording read/write head 29 is located at the end or trailing surface 25 of slider 28. The flexure 30 enables the slider 28 to "pitch" and "roll" on an air-bearing generated by the rotating disk 16. Disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2A:
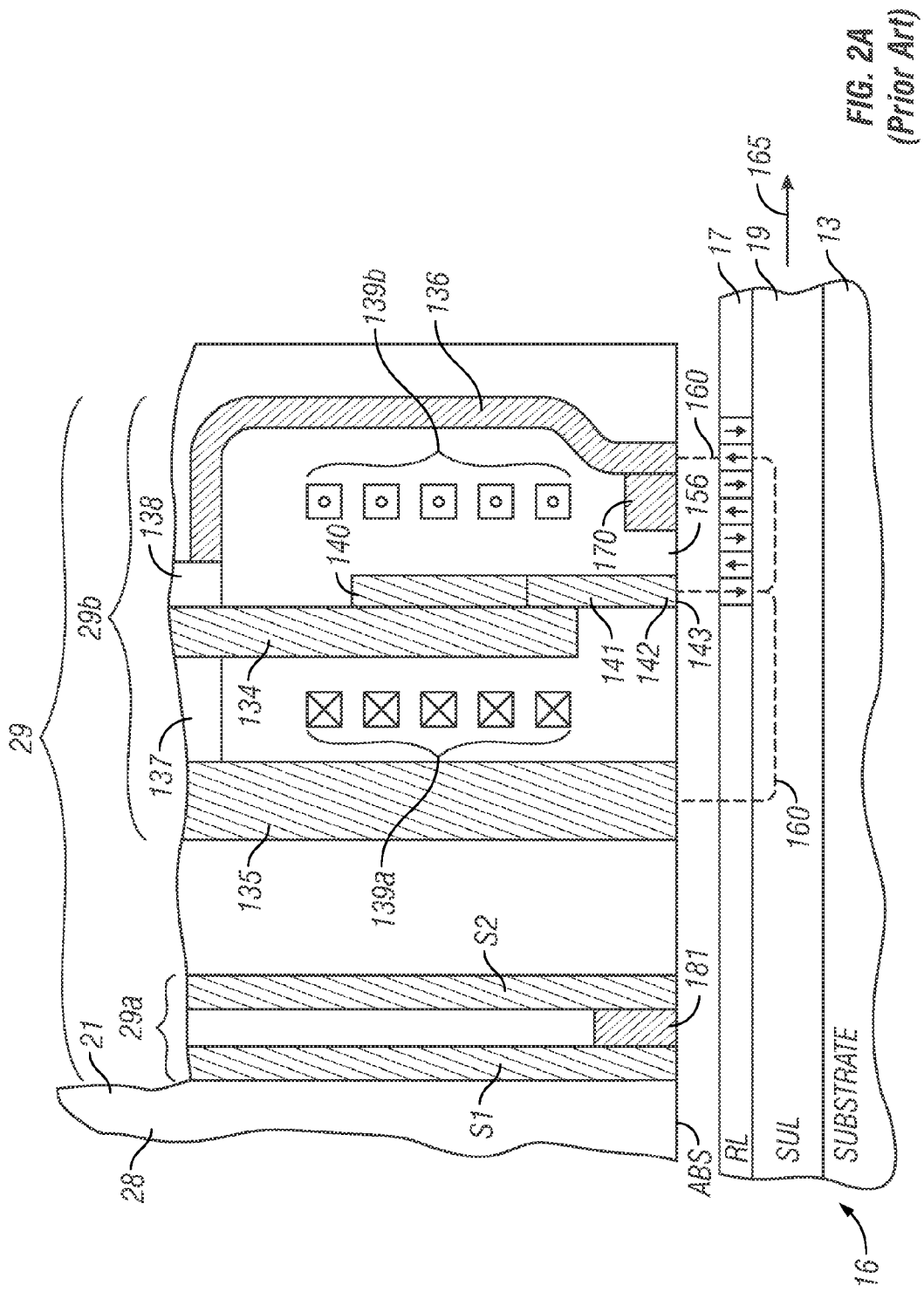
FIG. 2A is a side sectional view of a prior art perpendicular magnetic recording (PMR) write head, read head and a recording disk taken through a central plane that intersects a data track on the disk.

FIG. 2A is a side sectional view of a prior art perpendicular magnetic recording write head, read head and a recording disk taken through a central plane that intersects a data track on the disk. As shown in FIG. 2A, a "dual-layer" disk 16 includes a perpendicular magnetic data recording layer (RL) 17 on a "soft" or relatively low-coercivity magnetically permeable underlayer (SUL) 19 formed on the disk substrate 13. The read/write head 29 is formed on slider 28 and includes read head 29a and write head 29b. Read head 29a includes the magnetoresistive (MR) read element or sensor 181 located between two magnetic shields S1, S2. The write head 29b is a single write pole type of perpendicular magnetic recording (PMR) write head and includes a yoke structure with main pole 134, write pole 140, first flux return pole 135, second flux return pole 136, trailing magnetic shield 170, and yoke studs 137, 138 connecting the main pole and return poles 135, 136 respectively. The write head 29b also includes a thin film coil 139a, 139b shown in section around main pole 134. The write coil 139a, 139b is a helical coil wrapped around mail pole 134, but the write coil may also be a conventional dual "pancake" coil in which all the coil sections are in substantially the same plane and wrapped around the yoke. A flared write pole (WP) 140 is part of the main pole 134 and has a flared portion 141 and a pole tip 142 with an end 143 that faces the outer surface of disk 16. Write current through coil 139a, 139b induces a magnetic field (shown by dashed line 160) from the WP 140 that passes through the RL 16 (to magnetize the region of the RL 16 beneath the WP 140), through the flux return path provided by the SUL 19, and back to the ends 35a, 36a of return poles 35, 36, respectively.

The read/write head 29 is typically formed as a series of thin films deposited on a trailing surface 21 of air-bearing slider 28 that has its air-bearing surface (ABS) supported above the surface of disk 16. The MR read head 29a is comprised of MR sensor 181 located between MR shields S1 and S2 and is deposited on the trailing end 21 of the slider 28 prior to the deposition of the layers making up the write head 29b. In FIG. 2A, the disk 16 moves past the write head 29b in the direction indicated by arrow 165, so the portion of slider 28 that supports the read head 29a and write head 29b is often called the slider "trailing" end, and the surface 21 perpendicular to the slider ABS on which the write head 29b is located is often called the slider "trailing" surface.

The RL 17 is illustrated with perpendicularly recorded or magnetized regions, with adjacent regions having opposite magnetization directions, as represented by the arrows. The magnetic transitions between adjacent oppositely-directed magnetized regions are detectable by the MR sensor 181 as the recorded bits.

FIG. 2A also illustrates a trailing shield (TS) 170 separated from WP 140 by a nonmagnetic gap layer 156. The TS 170 is magnetically permeable material formed of soft (low coercivity) ferromagnetic material. The TS 170, which is separated from the WP 40 by nonmagnetic gap 156, alters the angle of the write field as well as its gradient, and makes writing more efficient.

Figure 2B:
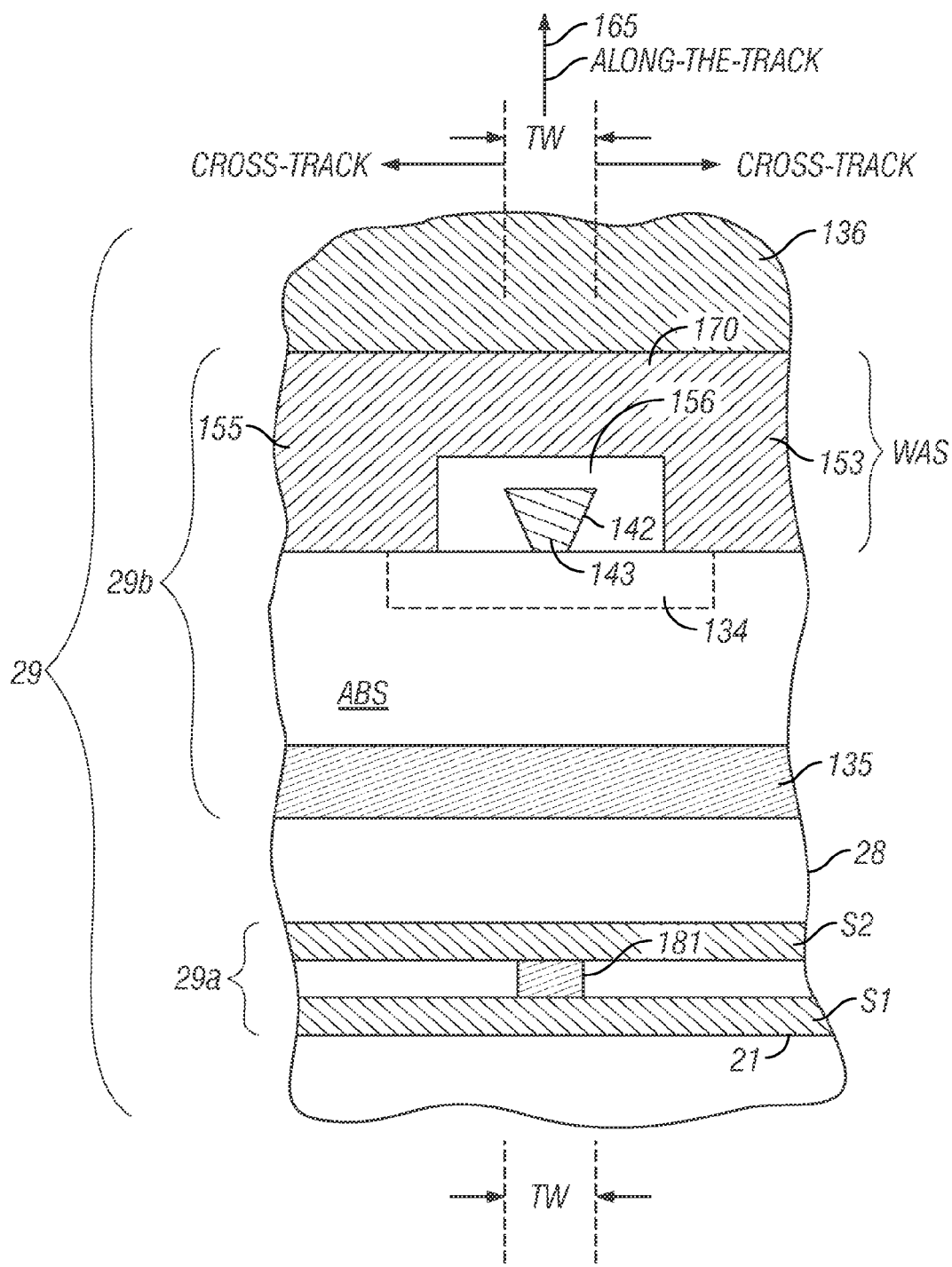
FIG. 2B is a view of the read/write head of FIG. 2A as seen from the disk.

FIG. 2B illustrates the read/write head 29 as seen from the disk 16. The ABS is the recording-layer-facing surface of the slider 28 that faces the disk 16 (FIG. 2A) and is shown without the thin protective overcoat typically present in an actual slider. The recording-layer-facing surface shall mean the surface of the slider 28 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The disk 16 (FIG. 2A) moves relative to the read/write head 29 in the direction 165, which is called the along-the-track direction. The direction perpendicular to direction 165 and parallel to the plane of the ABS is called the cross-track direction. The width of the end 143 of WP tip 142 in the cross-track direction substantially defines the track-width (TW) of the data tracks in the RL 16 (FIG. 2A). The main pole 134 is shown with dashed lines because it is recessed from the ABS (see FIG. 2A).

The portions identified as 153, 155 on opposite ends of TS 1700 are side shields which, together with TS 170, form a wraparound shield (WAS) that generally surrounds the WP tip 142. The WAS that includes side shields 153, 155 and TS 170 is described in detail as a shield for a conventional perpendicular recording head in U.S. Pat. No. 7,002,775 B2, assigned to the same assignee as this application. The shields 170, 153, 155 all have ends substantially at the recording-layer-facing surface. The shields 170, 153, 155 are formed as a single-piece structure to form the WAS that substantially surrounds the WP tip 142 and are thus formed of the same material, typically a NiFe, CoFe or NiFeCo alloy, so that they have the same alloy composition. The TS 170 and side shields 153, 155 are separated from WP tip 142 by nonmagnetic gap material which forms the gap layer 156. The WAS, which is separated from the WP tip 142 by gap layer 156, alters the angle of the write field and improves the write field gradient at the point of writing, and also shields the writing field at regions of the RL away from the track being written. The WAS is shown as connected to the return pole 136. However, the WAS may be a "floating" WAS shield not connected to either the return pole 136 or other portions of the yoke by flux-conducting material. Also, instead of a WAS, the write head 29b may have separate side shields not connected to the TS 170.

Figure 3A:
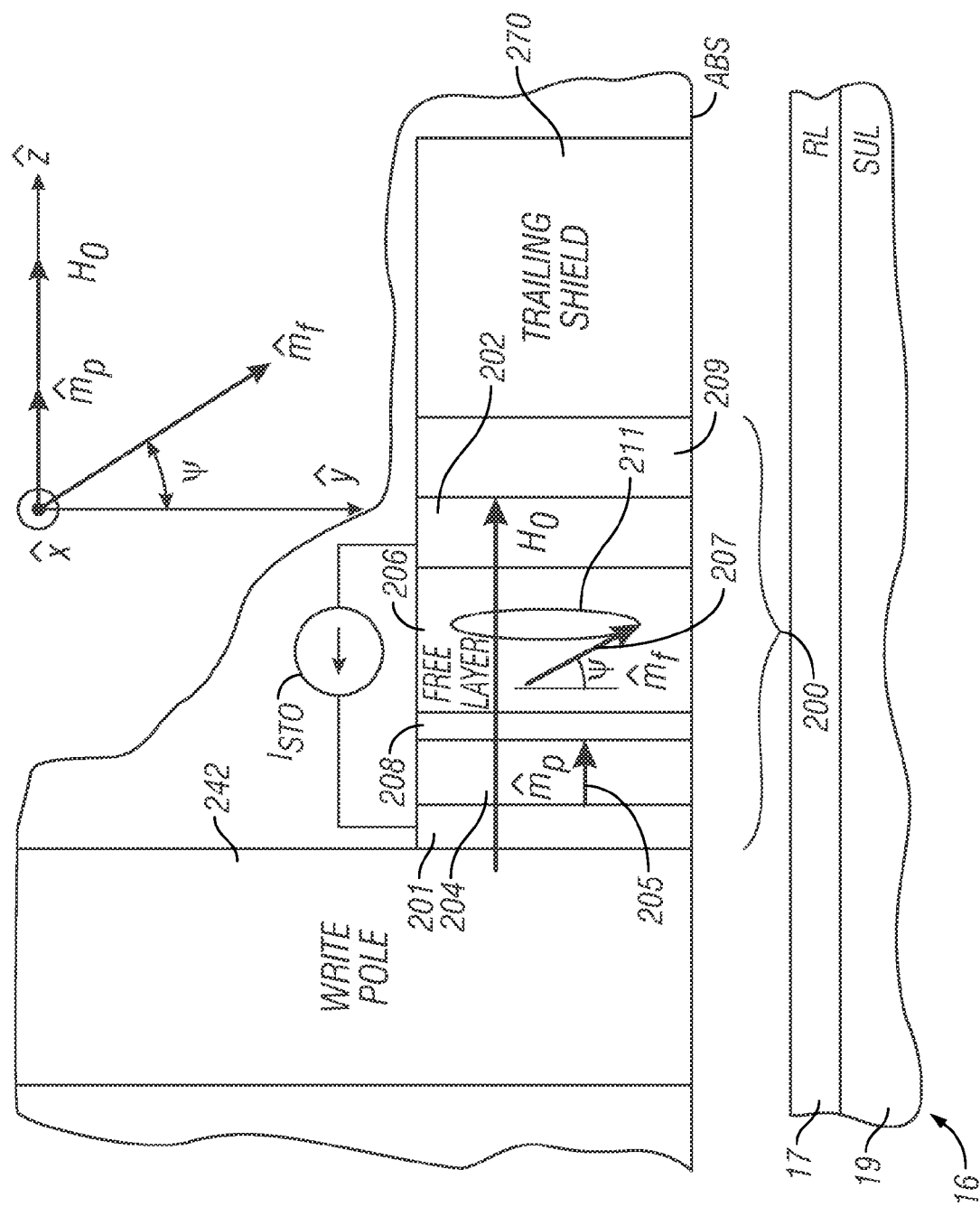
FIG. 3A is a side sectional view of a PMR write head with a spin torque oscillator (STO) located between the write pole and the trailing shield showing the magnetization $m_p$ of the polarizer layer fixed in a direction aligned with the Z-axis, as described in the prior art.

FIG. 3A is a side sectional view of a PMR write head similar to that as described above, but with an idealized spin torque oscillator (STO) 200 located between the write pole 242 and the trailing shield 270, as described in the prior art. The STO 200 includes electrodes 201, 202, a ferromagnetic polarizing layer or polarizer 204 having its magnetization 205 ($m_p$) pinned or fixed, a free ferromagnetic layer 206 having its magnetization ($m_f$) 207 free to rotate, and a nonmagnetic spacer layer 208 between the polarizer 204 and free ferromagnetic layer 206. As described in the prior art, the ferromagnetic polarizer layer 204 is designed to have magnetization $m_p$ that is essentially along the +Z-axis, perpendicular to the (X-Y) plane of the polarizer layer. The polarizer layer 204 is made from a multilayer such as Co/Pt with very large perpendicular anisotropy, possibly exchange coupled to an additional thin ferromagnetic layer (e.g., an alloy of Co, Fe and/or Ni) to enhance spin polarization. The ferromagnetic free layer 206 can be formed of Co, Fe or Ni, one of their alloys, or a multilayer of these materials, such as a CoFe/NiFe bilayer. The nonmagnetic spacer layer 208 is typically formed of Cu, but may also be formed of other materials like Au or Ag. The material 209 between electrode 202 and trailing shield 270 may be insulating material like alumina. Alternatively, the separate electrodes 201, 202 may be eliminated and the write pole 242 and trailing shield 270 may function as the leads or electrodes, in which case layer 209 would be an made of an electrically conductive material. Layer 201 would then function as a nonmagnetic conductive seed layer on which to grow the perpendicular multilayer 204. The layers making up the STO 200 are formed on the slider body after the write pole 242 is formed, using conventional deposition and lithographic techniques well-known in the fabrication of thin film read/write heads.

Also shown in FIG. 3A is a coordinate system showing the X-Y plane as being parallel to the plane of free layer 206 with the Z-axis being orthogonal to the X-Y plane and orthogonal to the Y-axis with which the write pole 242 is generally aligned. In a STO as described in the prior art, a dc current ($I_{STO}$) with a current density J ($A/\mu m^2$) above a critical value, is applied across the electrodes 201, 202 to induce a spin torque on the magnetization 207 of the free ferromagnetic layer 206. The direct current $I_{STO}$, which is spin-polarized by the presence of the polarizer layer 204, induces a torque to the free layer 206 which can induce a precessional motion of the magnetization 207 of the free layer 206. The polarizer layer 204, e.g., a Co/Pt multilayer with large perpendicular anisotropy, has its magnetization 205 oriented essentially parallel to the Z-axis, corresponding to an angle $\phi_p=0$ (because $\phi_p=0$, the angle $\phi_p$ is not depicted in FIG. 3A). This orientation is approximately maintained in the presence of the write field $H_0$ from the write pole 242. The free layer magnetization $m_f$ (207) makes an angle $\psi$ with the X-Y plane and has a component in the X-Y plane that rotates at an azimuthal angle $\theta$ (not shown) about the Z-axis with a certain frequency $f$, where $f=(1/2\pi)(d\theta/dt)$. The rotation of the free layer magnetization about the Z-axis at this approximately fixed angle $\psi$ is depicted by the oval 211 which represents a circular precessional motion of the tip of the magnetization vector $m_f$ lying in a plane parallel to the X-Y plane. The frequency of precession depends on the properties and thicknesses of the materials making up the STO 200, but for a specific STO the frequency of precession is a function of the values of both $I_{STO}$ and $H_0$.

During writing, the write pole 242 applies a write field to the magnetic grains in the recording layer (RL) at the same time the precession of the free layer magnetization 207 from the STO 200 applies an auxiliary ac field at frequency $f$ to the magnetic grains. This results in microwave-assisted magnetic recording (MAMR), which improves the switching of the magnetization of the grains in the RL, with the improvement depending on the frequency $f$ at which the auxiliary field is applied. As is well known in the art, ferromagnetic materials absorb energy from ac magnetic fields more efficiently at or near their ferromagnetic resonance frequency, as described in Kittel C., "On the Theory of Ferromagnetic Resonance Absorption", Phys. Rev. 73, pp. 155-161 (1948). Accordingly, the frequency $f$ of the auxiliary magnetic field from the free layer 206 of the STO 200 is designed to be preferably within a range near the ferromagnetic resonance of the magnetic material making up the grains in the RL, e.g., 30-50 GHz. As a result, the write field required from the conventional PMR write head can be reduced from what would be required to switch the magnetization of the grains in the RL without MAMR. Conversely, MAMR may be used to increase the coercivity of the RL above that which could be written to by a conventional PMR write head alone.

The write pole 242 produces a large magnetic field at the site of the STO 200, as represented in FIG. 3A by the vector $H_0$. In practice, the external field from the write pole 242 will be constantly switching polarity and thus $H_0$ will be constantly switching direction by 180 degrees (e.g., along the +Z and −Z axes). It will be implicitly assumed that the field amplitude is sufficiently large to similarly reverse the Z-component of the polarizer magnetization $m_p$ with each reversal in polarity of the field $H_0$. As such, the descriptions of the STO oscillator can be considered invariant with respect to the actual polarity of the field $H_0$, and the remaining descriptions and illustrations will assume or use a single fixed polarity of the field $H_0$.

Figure 3B:
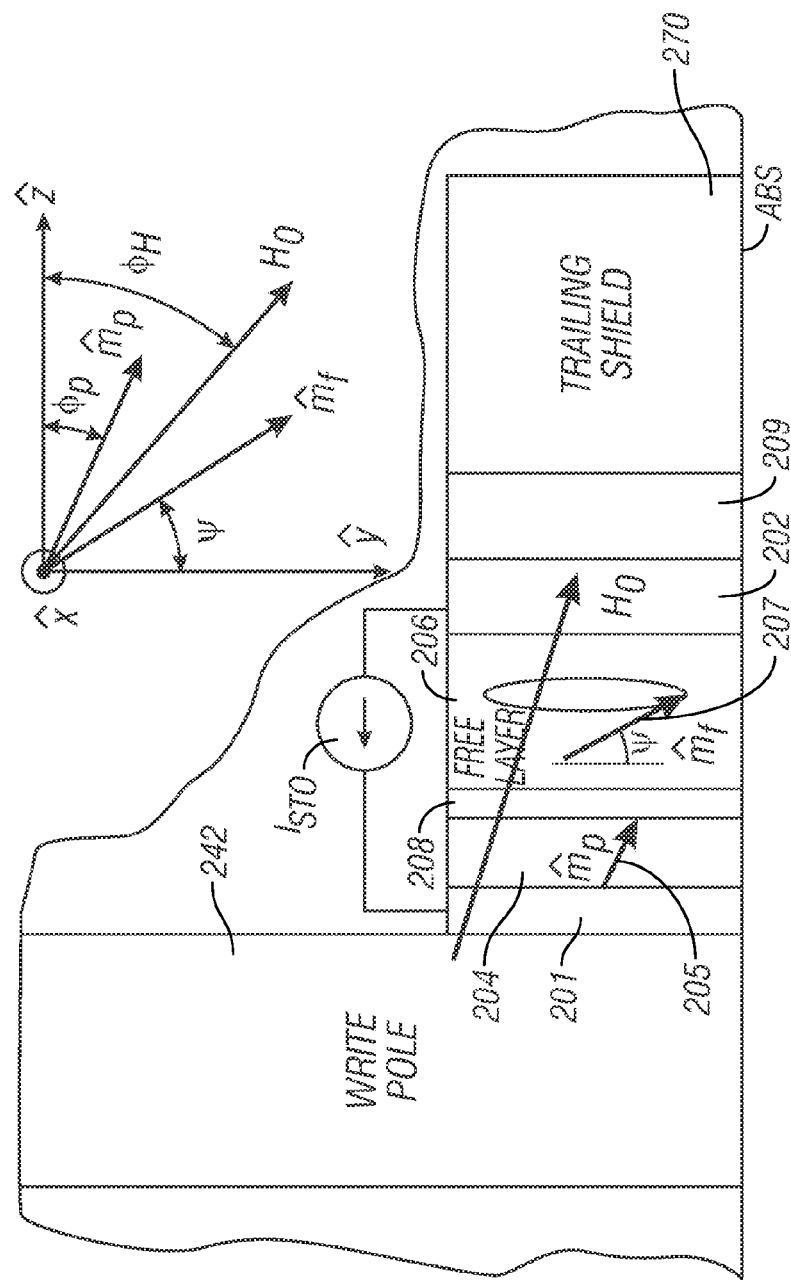
FIG. 3B is a side sectional view of a PMR write head with a STO located between the write pole and the trailing shield and showing the magnetization $m_p$ of the polarizer layer at a non-zero angle $\phi_P$ relative to the Z-axis in the presence of the write field $H_0$ at a non-zero angle $\phi_H$ relative to the Z-axis.

Finite element modeling indicates that the field $H_0$ from the write pole 242 at the site of the free layer 206 of the STO 200 makes an angle $\phi_H$ with the +Z-axis of about 15-20°, as depicted in FIG. 3B. However, in the prior art PMR write head with STO 200, it is implicitly assumed that $H_0$ is aligned essentially along the Z-axis, as shown in FIG. 3A, such that the angle $\phi_H$ is essentially zero (because $\phi_H=0$, the angle $\phi_H$ is not depicted in FIG. 3A). Thus $H_0$ was aligned essentially parallel with the perpendicular magnetization of the polarizer 204, i.e., orthogonal to the X-Y plane and the plane of free layer 206. The dc bias current $I_{STO}$ with current density J also flows along the +Z-axis (electrons flow in the opposite direction). For certain magnitudes of current density J, the resultant spin-torque on the free layer 206 magnetization 207 ($m_f$) can theoretically result in a pure precession about the Z-axis with constant orientation angle $\psi$ and constant precession frequency $f$. To maximize the microwave auxiliary field generated by the oscillating free layer magnetization at the magnetic grains of the RL, it is desirable that $\psi<30°$, so that $m_f$ rotates primarily in the X-Y plane.

However, it has been discovered in conjunction with the present invention, that the idealized STO described in the prior art, such as STO 200 illustrated in FIG. 3A, suffers from certain design flaws. The basic design equations for this ideal STO have been determined in a "macrospin" approximation. (A macrospin approximation means that each magnetic layer is represented as if it behaved as one homogeneous magnetization vector or "macrospin"). These equations are given below:

$$f = \gamma H_z; \alpha(H_z \equiv H_0 - H'_{zz}\sin\psi) = \eta(\psi)\underbrace{\frac{(\hbar/2e)P}{(M_s t)_{free}}J}_{H_{ST}} \quad (1)$$

$$\frac{\partial}{\partial\psi}[\alpha(H_0 - H'_{zz}\sin\psi)] - \frac{\partial}{\partial\psi}[\eta(\psi)H_{ST}] < 0 \quad (2)$$

$$\eta(\psi) \cong \frac{\Gamma}{(\Gamma+1)+(\Gamma-1)\sin\psi} \quad (3)$$

where gyromagnetic ratio $\gamma=3$ GHz/kOe, damping parameter $\alpha\sim0.015$, and spin-polarization $P\sim0.5$. The total Z-axis field $H_z$ on the free layer includes the demagnetizing field contribution from the net Z-axis demagnetization tensor element $$H'_{zz} = H_{zz} - \frac{1}{2}(H_{xx} + H_{yy}).$$

The "spin-torque field" $H_{ST}$ defined in Eq. (1) characterizes the strength of the spin-torque interaction on the free layer, and scales proportional to J, the dc bias current density. Eq. (1) describes the operational relationships between oscillation frequency $f$, precession orientation angle $\psi$, and current density J. However, typically ignored in past descriptions is the condition required for stable oscillation described in Eq. (2), as well as the angular dependence of the factor $\eta(\psi)$, which theory indicates can be approximately described by the expression in Eq. (3). The dimensionless variable $\Gamma$ arises in the theory of electron transport in metallic current-perpendicular-to-the-plane (CPP) multilayers with non-collinear magnetization in two or more ferromagnetic layers. Experimental data indicates typical values for $\Gamma$ considerably greater than one, e.g., $\Gamma \approx 3$ (or more).

Figure 4:
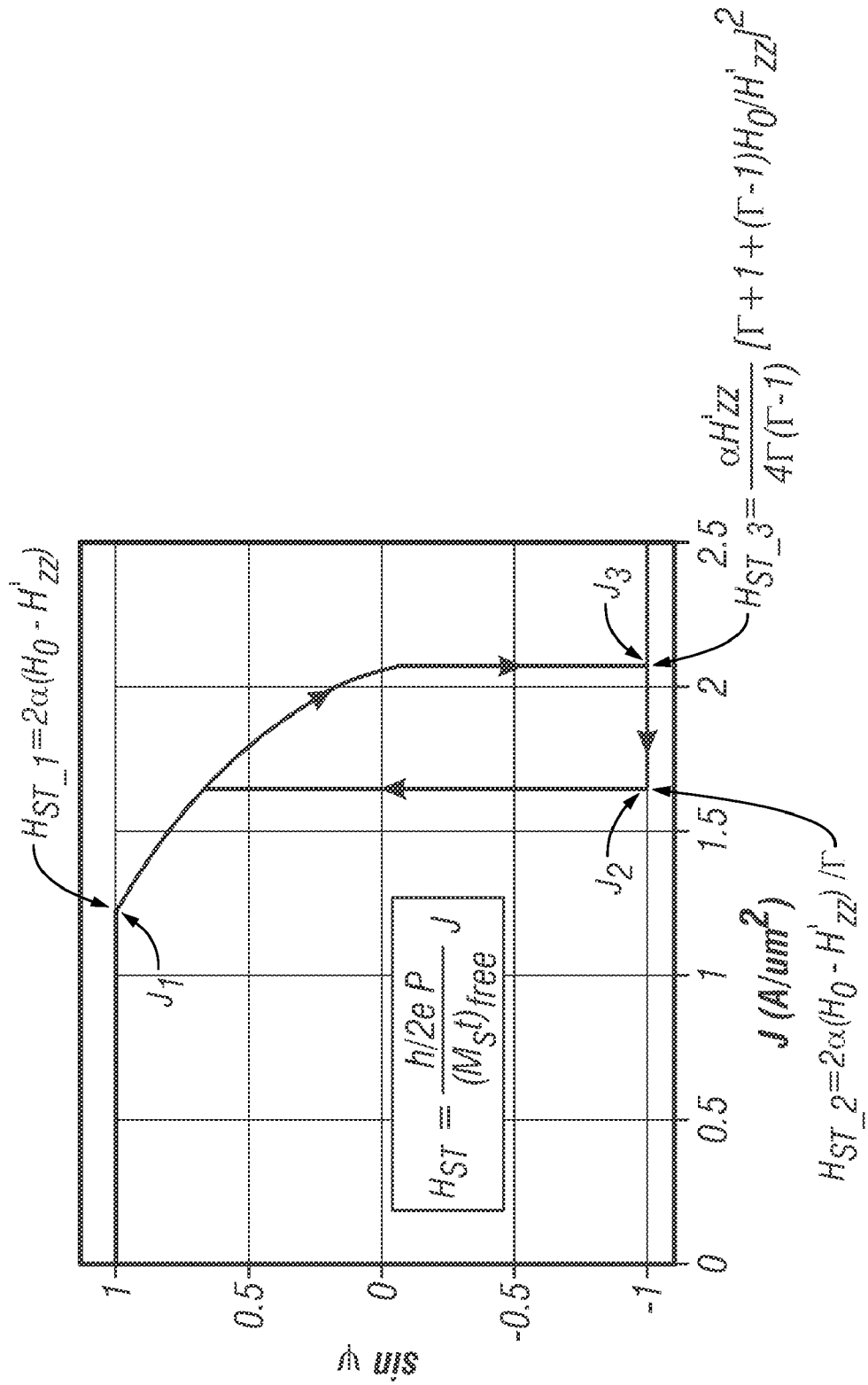
FIG. 4 is a graph representing a macrospin model stability analysis computation of the critical current densities for the prior art STO design and showing the finite range of bias current densities $J_1 \leq J \leq J_3$ over which stable oscillation of the prior art STO is possible.

The negative implications of these stability conditions for the prior art STO designs (or their equivalents) are described both qualitatively and quantitatively in FIG. 4. In particular, there is a finite current range of bias current amplitudes $J_1 \leq J \leq J_3$ over which stable oscillation of the STO is possible, and a potentially even more restricted operational range $J_1 \leq J \leq J_2$ over which hysteretic-free operation is guaranteed. Because the range $J_2 \leq J$ allows a non-oscillatory, reversed state with $\psi=180°$, which is destructive of the purpose of the STO for MAMR, it is considered unacceptable for practical operation. These problems do not arise in the nonrealistic case $\Gamma=1$, which is equivalent to neglecting the angle dependence $\eta(\psi)$ as was generally done in prior art design. However, for more realistic values of $\Gamma \approx 3$, it is quite possible that $J_2 \leq J_1$ for practical parameter values, in which case the ideal STO as described in the prior art would have a null range of practical operation. It has further been discovered, in accordance with this invention, that this problem can be to be exacerbated when accounting for a realistic finite angle $\phi_H$ of the PMR write head field, which yields an in-plane (Y-axis) field $H_0 \sin \phi_H$ which can be relatively large, e.g., ~3 kOe.

Figure 5A:
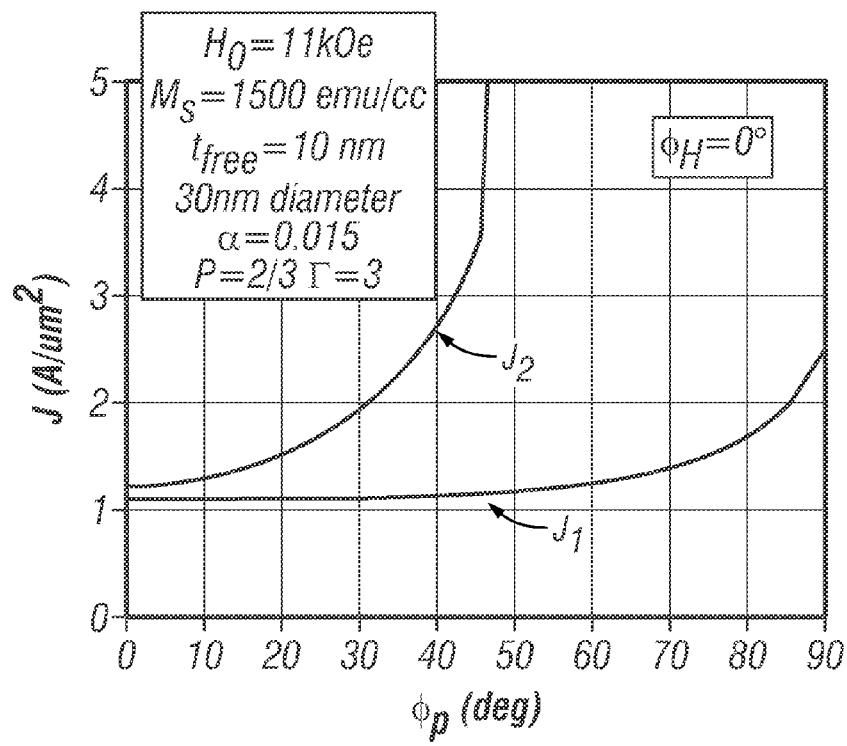
FIG. 5A is a graph showing a macrospin model stability analysis computation of the critical current densities J1 and J2 as a function of a STO polarizer magnetization angle $\phi_P$ for a PMR write head with a STO experiencing a field $H_0$ from the write head that makes an angle $\phi_H=0$ with the Z-axis as suggested by the prior art.
Figure 5B:
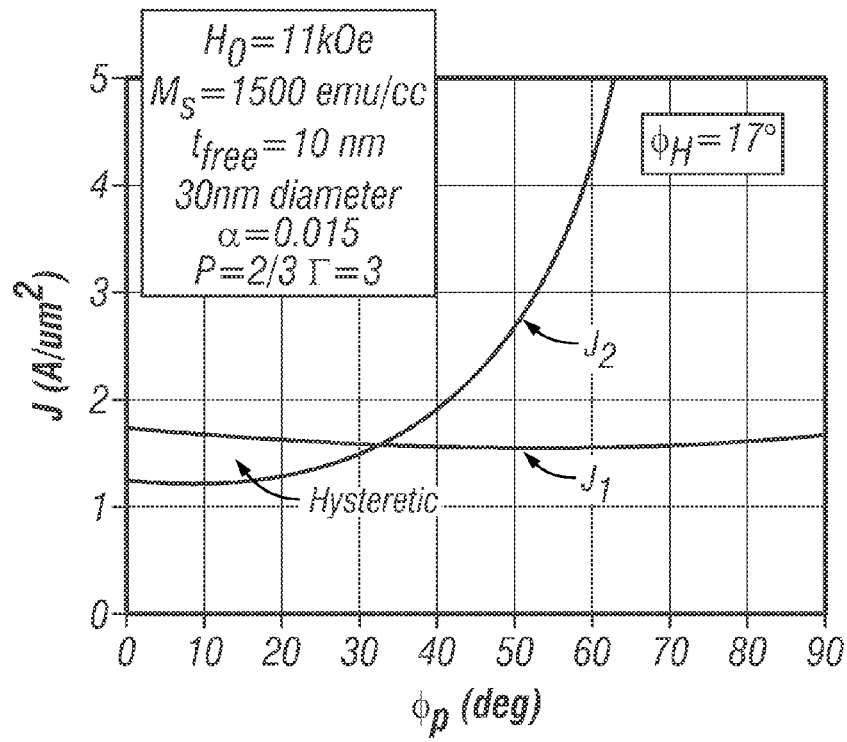
FIG. 5B is a graph showing a macrospin model stability analysis computation of the critical current densities J1 and J2 as a function of a STO polarizer magnetization angle $\phi_P$ for a PMR write head with a STO experiencing a field $H_0$ from the write head that makes an angle $\phi_H=17°$ with the Z-axis.

FIGS. 5A and 5B show a numerically generated macrospin-model stability analysis (analogous to the analytical results for the special case $\phi_p=\phi_H=0$ described in FIG. 4) for a STO like that shown in FIG. 3B with the critical current densities $J_1$ and $J_2$ and with the realistically representative, fixed parameter values indicated. In the STO of FIG. 3B, these parameter values include a value of $H_0=11$ kOe (as estimated by finite element modeling of a realistic geometry PMR write head), and a free layer 206 with a saturation magnetization $M_s=1500$ emu/cm$^3$, thickness $t_f=10$ nm, and diameter=30 nm. In these calculations, the polarizer layer 204 has its magnetization $m_p$ fixed in orientation, but not necessarily aligned with the Z-axis (FIG. 3B). In particular, the results of FIGS. 5A-5B are plotted as a function of the angle $\phi_p$, of the polarizer layer magnetization $m_p$ with respect to the Z-axis, which in accordance with the prior art, was assumed to be fixed at approximately $\phi_p=0$.

The result in FIG. 5A shows that even for the idealized (prior art) assumption of $\phi_H=0$, the narrow operating window at $\phi_p=0$ (where $J_2$ is barely greater than $J_1$) can be greatly expanded by deliberately re-orientating the polarization/magnetization $\phi_p$ of the polarizer layer 204 by a substantial angle, e.g., $\phi_p\approx30°$, away from the Z-axis. However, in the more realistic case of nonzero $\phi_H=17°$ (estimated by finite element modeling), the benefit of large, nonzero $\phi_p$ is even more pronounced. In particular, the calculations indicate that below $\phi_p=30°$, (consistent with prior art design), such a device with $J_2<J_1$ (as well as with $J_3\approx J_2$) would only exhibit non-oscillatory, hysteretic switching, rendering it nonfunctional as a practical STO for MAMR.

Figure 6:
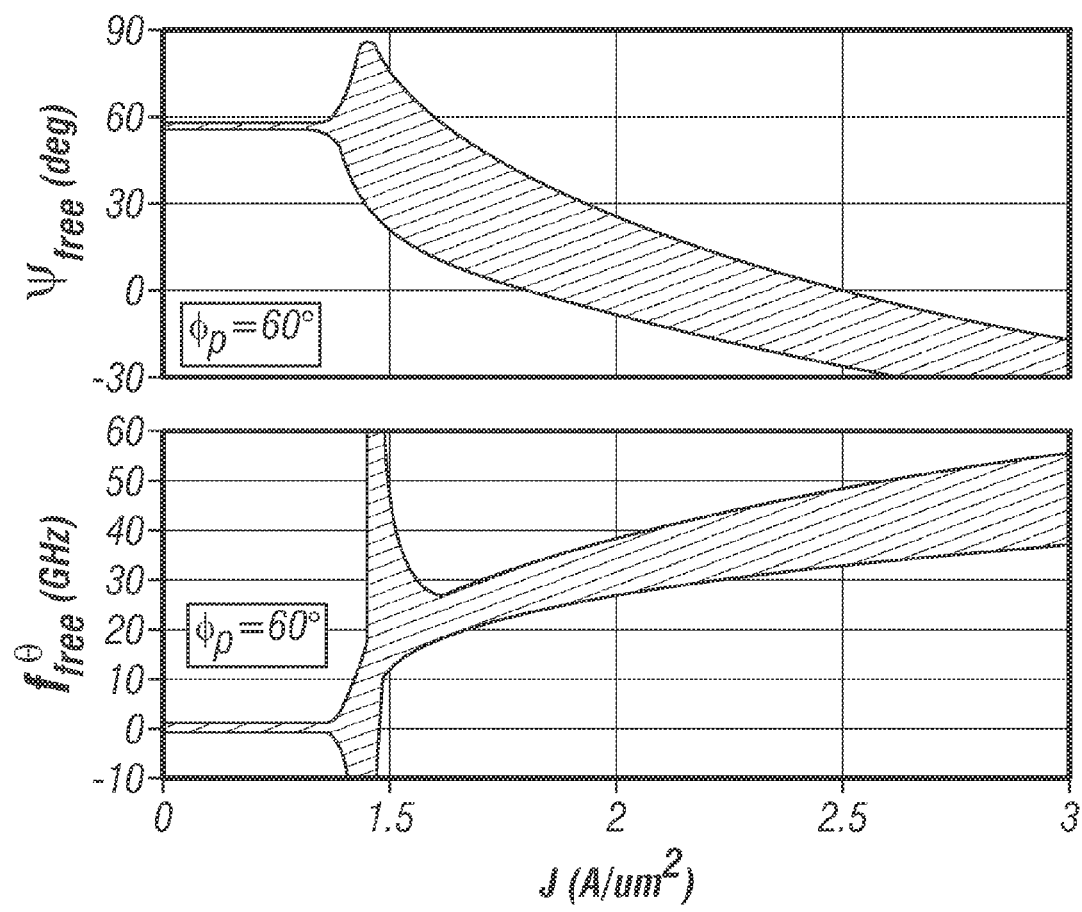
FIG. 6 is graph of $\psi$ (the angle the magnetization of the STO free layer makes with the X-Y plane) and f (the frequency of precession of the in-plane magnetization of the STO free layer) as a function of STO current density J, from a computer simulation of a STO for the case where the magnetization angle $\phi_p$ of the magnetization $m_p$ of the polarizer layer relative to the Z-axis is fixed at an approximately optimal value of 60°.

FIG. 6 shows a computer-simulation of the dynamics of the STO described in FIG. 5B (in the simple macrospin approximation) as the current density J is quasi-statically swept between 1 and 3 A/μm$^2$. In this case, the magnetization angle $\phi_p$ of the magnetization $m_p$ of polarizer layer 204 was chosen at an approximately optimal value of 60°. Because the large in-plane (Y-axis) component $H_0 \sin \phi_H\sim3$ kOe breaks the azimuthal symmetry about the Z-axis, the oscillation of the magnetization of the free layer 206 has the characteristics of a "wobbly" precession, in which the precession angle ψ and the instantaneous frequency $f$ vary over a magnetization orbit. This is represented in FIG. 6 by the finite width banded curves shown in cross-hatching (for which the individual orbits cannot be resolved). Nonetheless, this simulated STO achieves a reasonably optimized precession angle ψ<30°, in a practical frequency range approximately 30-50 GHz, for current densities varying between 2-3 A/μm². Since both the angle it and the precession frequency $f$ depend significantly on current density J, there is more generally enabled some "tunability" of STO properties. The minimum oscillatory operational current density of ~1.5 A/μm² indicated in the simulation of FIG. 6 is consistent with the stability analysis of FIG. 5B.

In this invention the STO is designed so that $\phi_P$ has a relatively large value in the presence of the vector field $H_0$ at the site of the STO. Given a known (or estimated) field magnitude $H_0$ and orientation $\phi_H$ from the write pole 242, the size, thickness and saturation magnetization $M_s$ of the constituent layers of the polarizer layer 204 are all adjustable parameters to control the shape anisotropy of the polarizer layer, and thus affect the design point for the equilibrium orientation $\phi_P$.

Figure 7A:
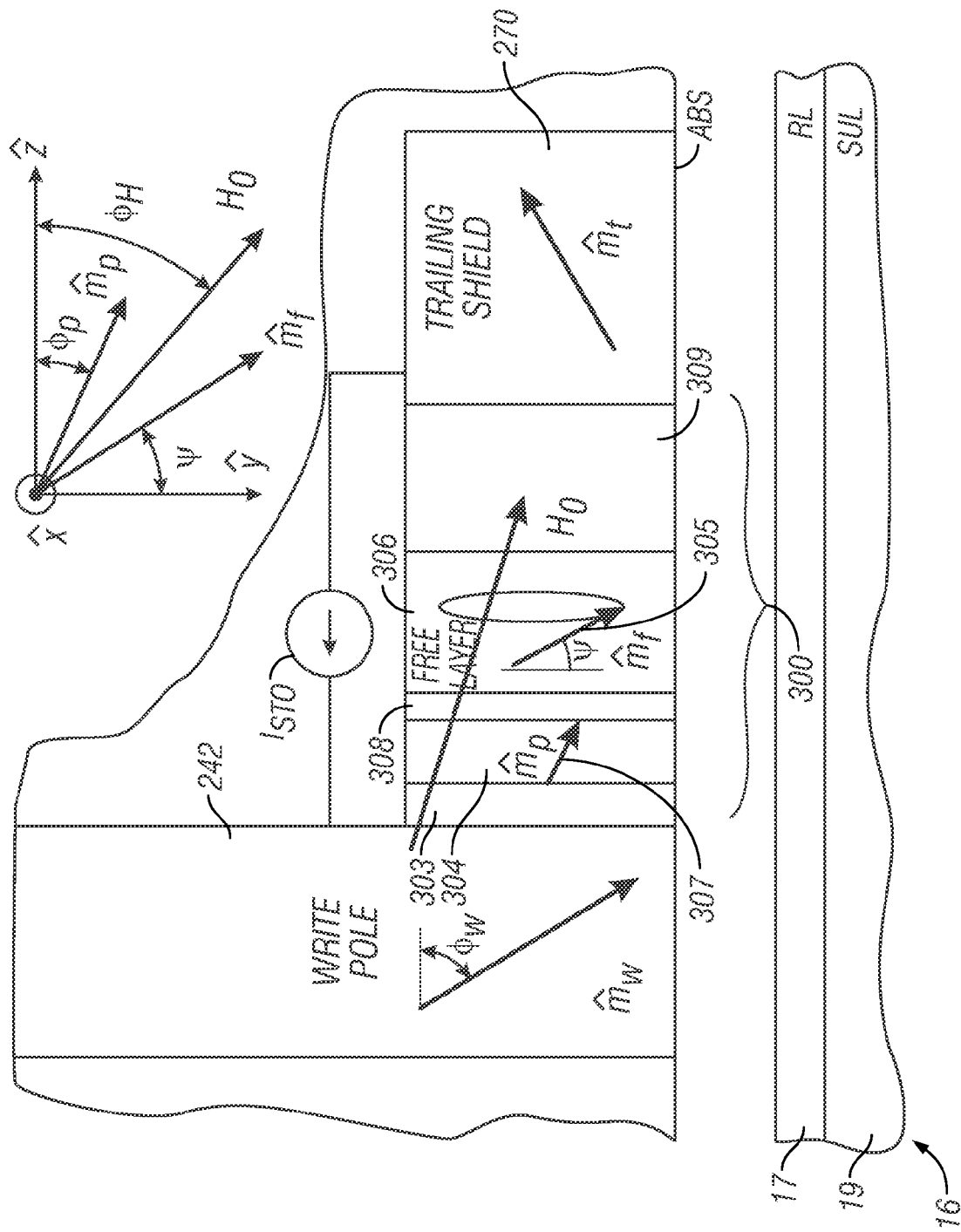
FIG. 7A shows an embodiment of the invention where the STO polarizer layer with a non-zero value of $\phi_p$ is located between the write pole and the free layer.

FIG. 7A shows one embodiment of the invention. The STO 300 uses the write pole 242 and trailing shield 270 as electrodes. The STO 300 has a free layer 306 with magnetization 305 ($m_f$), a polarizer layer 304 with magnetization 307 ($m_p$), electrically conducting spacer layer 303 between write pole 242 and polarizer layer 304, a nonmagnetic electrically conducting spacer 308 between polarizer layer 304 and free layer 306, and electrically conducting spacer layer 309 between the free layer and trailing shield 270. The spacer 308 should preferentially be made of a material, e.g., Cu, with a spin-diffusion length that is much greater than its thickness. The spacer 309 could alternatively be made from a material, e.g., Pt, with a short spin-diffusion length relative to its thickness in order to eliminate spin-torques on the free layer 306 from electron transport between it and the magnetic trailing shield 270. Unlike the prior art polarizer layer (204 in STO 200 in FIG. 3A) which incorporates a material with a very large perpendicular anisotropy (e.g., a Co/Pt multilayer), the polarizer layer 304 can be formed solely from a soft magnetic material with properties to enable its magnetization $m_p$ to be maintained at a substantial angle $\phi_P$, so that $m_p$ is deliberately non-aligned with the Z-axis. The polarizer layer 304 may be formed of an alloy of one or more of Co, Fe or Ni. Its composition, thickness, shape and saturation magnetization $M_s$ are selected such that in the presence of $H_0$ of a known strength and $\phi_H$ it will have a magnetization $m_p$ that is oriented at the desired angle $\phi_P$. For example, if $H_0$ is approximately 11 kOe, and $\phi_H$ is about 17° (as calculated from a finite element analysis) then $\phi_P$ should be between about 30 to 70° (see FIG. 5B). Assuming no exchange coupling between write pole 242 and polarizer layer 304 across the spacer layer 303, this can be accomplished by achieving sufficient shape anisotropy of the polarizer layer 304. For example, for a high-moment polarizer layer ($M_s$=about 1500-1800 emu/cc) with the ratio of lateral in-plane dimensions (e.g., diameter of a circularly-shaped polarizer layer or diagonal of a rectangularly-shaped polarizer layer) to thickness of roughly between 5 and 15, a net in-plane magnetostatic shape anisotropy greater than 5 kOe, e.g., between 10-20 kOe, may be obtained. While $\phi_H$ was calculated to be about 17°, $\phi_H$ for actual PMR write heads may be between about 10 to 30°. Thus, depending on the desired current density J, $\phi_P$ for actual PMR write heads may having a range greater than between about 30 to 70°, preferably between about 20 to 80°.

Figure 7B:
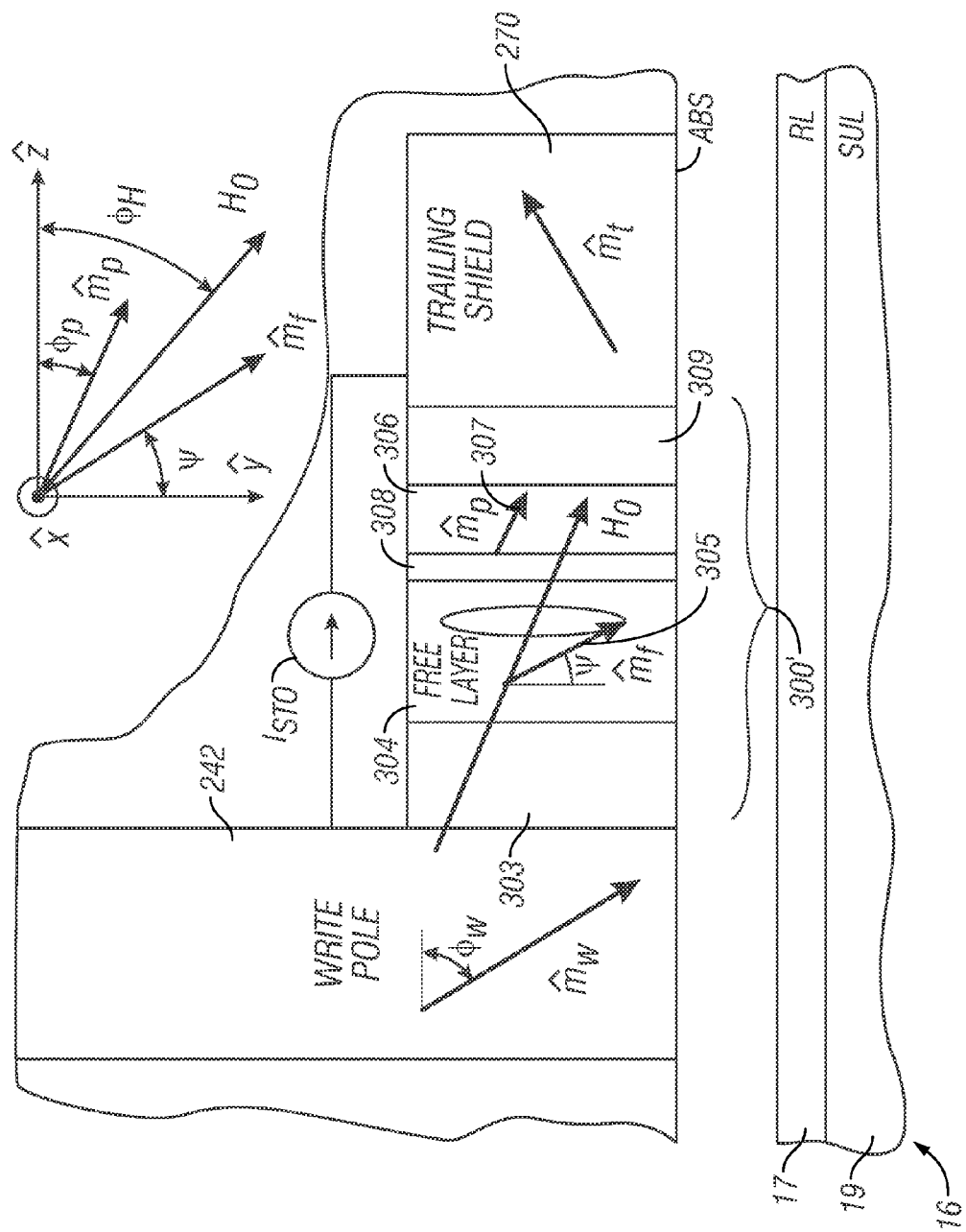
FIG. 7B shows an embodiment of the invention where the STO polarizer layer with a non-zero value of $\phi_p$ is located between the free layer and the trailing shield.

FIG. 7B shows another embodiment of the invention similar to that of FIG. 7A, except that STO 300' has polarizer layer 304 located nearest the trailing shield 270 with electrically conducting spacer layer 309 between the polarizer layer 304 and the trailing shield 270. For the embodiment of FIG. 7B, the polarity of the dc excitation current $I_{STO}$ would be reversed from that of the embodiment of FIG. 7A, and the purposes and materials of the conductive spacers 303 and 309 would be interchanged, but otherwise the physics of operation for these two embodiments would be similar. Since the effectiveness of the STO for MAMR is highly dependent on the location of the STO with respect to the write pole, the physical distance between the write pole 242 and free layer 306 would be approximately the same for both embodiments, and thus similarly would be the amplitude $H_0$ and angle $\phi_H$ of the write field at the site of the free layer 306.

The embodiment of FIG. 7A may be modified to create a structure wherein the polarizer layer 304 is ferromagnetically exchange coupled to the write pole 242. This can be accomplished by using a sufficiently thin (e.g., <2 nm) nonmagnetic (e.g., Cu) spacer layer 303 or a magnetic spacer layer 303, or by elimination of spacer layer 303 and deposition of polarizer layer 304 directly onto the write pole 242. The first approach of a thin nonmagnetic (e.g., Cu) spacer layer allows for possible adjustability in the exchange coupling strength, while the latter two approaches yield maximum-strength direct ferromagnetic exchange coupling. The advantage of this modified structure of FIG. 7A is in part based on finite element calculations which suggest that the angle $\phi_w$ of the write pole magnetization $m_w$ (after write pole reversal has approximately equilibrated) at the surface interfacing with spacer layer 303 is approximately 60°. This value is well within the previously described preferred range for polarizer magnetization angle $\phi_P$. Hence, sufficiently strong exchange coupling between the write pole magnetization and the polarizer layer may allow increased flexibility in decreasing the required shape anisotropy of the polarizer layer 304 (e.g., by either increasing the allowed range of thickness/diameter ratio and or decreasing the required saturation magnetization $M_s$) and still achieve a design target for the angle $\phi_P$. Because the write pole 242 is physically very much larger than the polarizer layer 304, exchange coupling the polarizer layer to the write pole will not have a significant impact on the write pole's magnetization dynamics or magnetization angle $\phi_w$. Also, the exchange coupling will further "anchor" the magnetization of the polarizer layer (after the magnetic reversal of both write pole and polarizer layer is mostly completed), making it less susceptible to possible spin-torque induced oscillations simultaneous with that of the free layer. Similarly, the embodiment of FIG. 7B may be modified to create an embodiment in which the polarizer layer 304 is ferromagnetically exchange coupled to the trailing shield 270 by modification of the spacer layer 309 between the polarizer layer 304 and the trailing shield 270 in the manner as described for spacer layer 303 in the modified embodiment of FIG. 7A.

FIG. 8 shows an embodiment of the invention wherein the STO 400 has no additional dedicated polarizer layer, but instead the write pole 242 acts as the polarizer. This is possible given that the expected (equilibrated) magnetization angle $\phi_w$ of the magnetization $m_w$ of the write pole 242 at its surface (the X-Y plane) is within the desired operational range for the $\phi_P$ of the polarizer magnetization $m_p$. That is, the magnetization $m_w$ near the surface of the write pole adjacent to the free layer 406 when the write pole is approximately fully magnetized is oriented at an angle between about 20 degrees and 80 degrees from the normal to the plane parallel to the free layer 406. The free layer 406 with $m_f$ 407 is separated from the write pole/polarizer 242 by nonmagnetic conducting spacer layer 408, which has analogous electrical properties (e.g., long spin diffusion length) to that described previously for spacer layer 303 in FIG. 7A. Also, electrically conductive nonmagnetic spacer layer 409 fills the gap between the free layer 406 and the trailing shield 270, and is analogous to the spacer layer 309 in FIG. 7A (e.g., with short spin-diffusion length). The advantage of this embodiment is its ultimate simplicity, requiring only one additional magnetic layer, that of the oscillating free layer 406. In a similar embodiment to that of FIG. 8, the trailing shield 270, rather than the write pole 242, may act as the effective polarizer.

Figure 9:
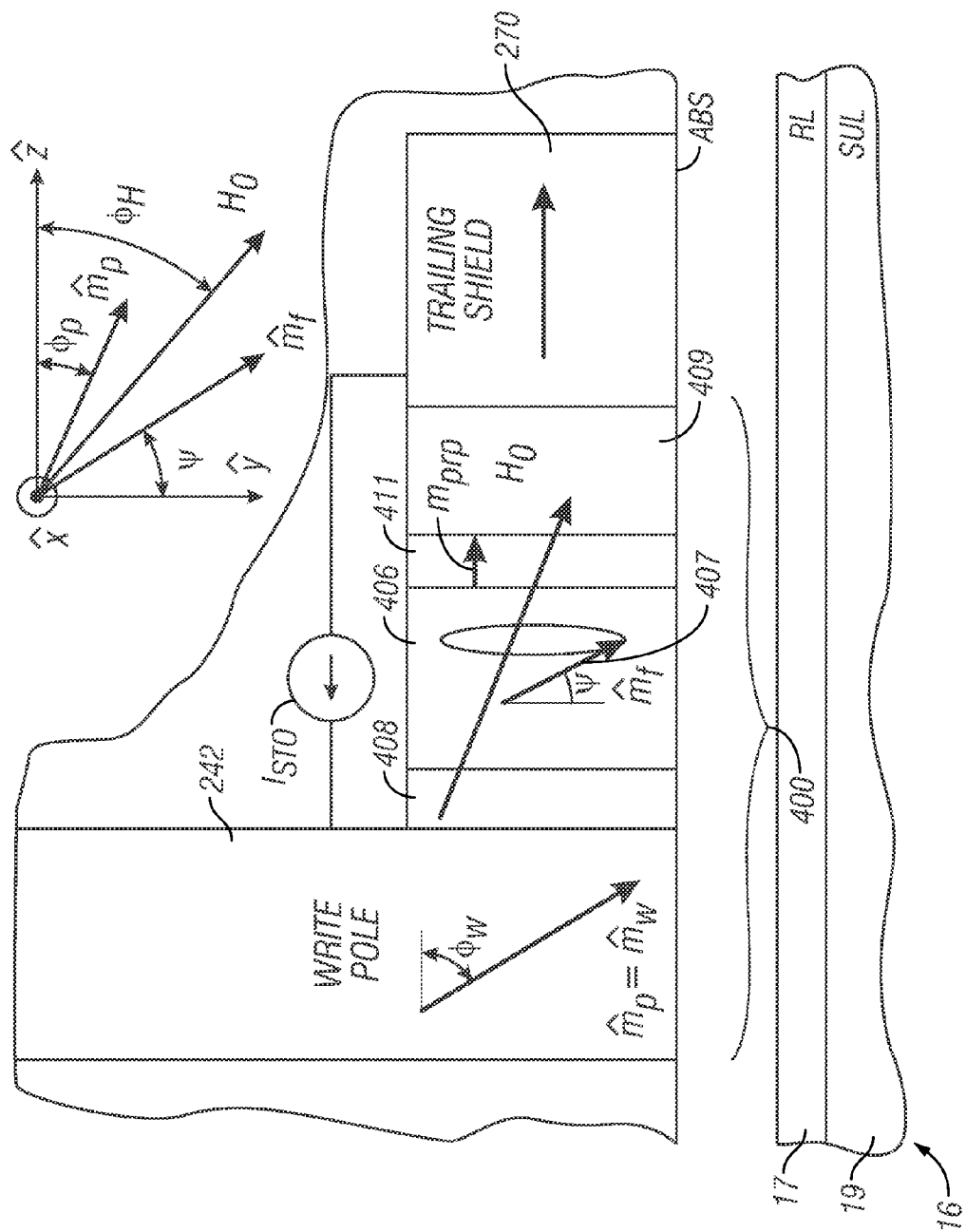
FIG. 9 shows an embodiment of the invention like that of FIG. 8 but with an additional perpendicular layer.
Figure 10:
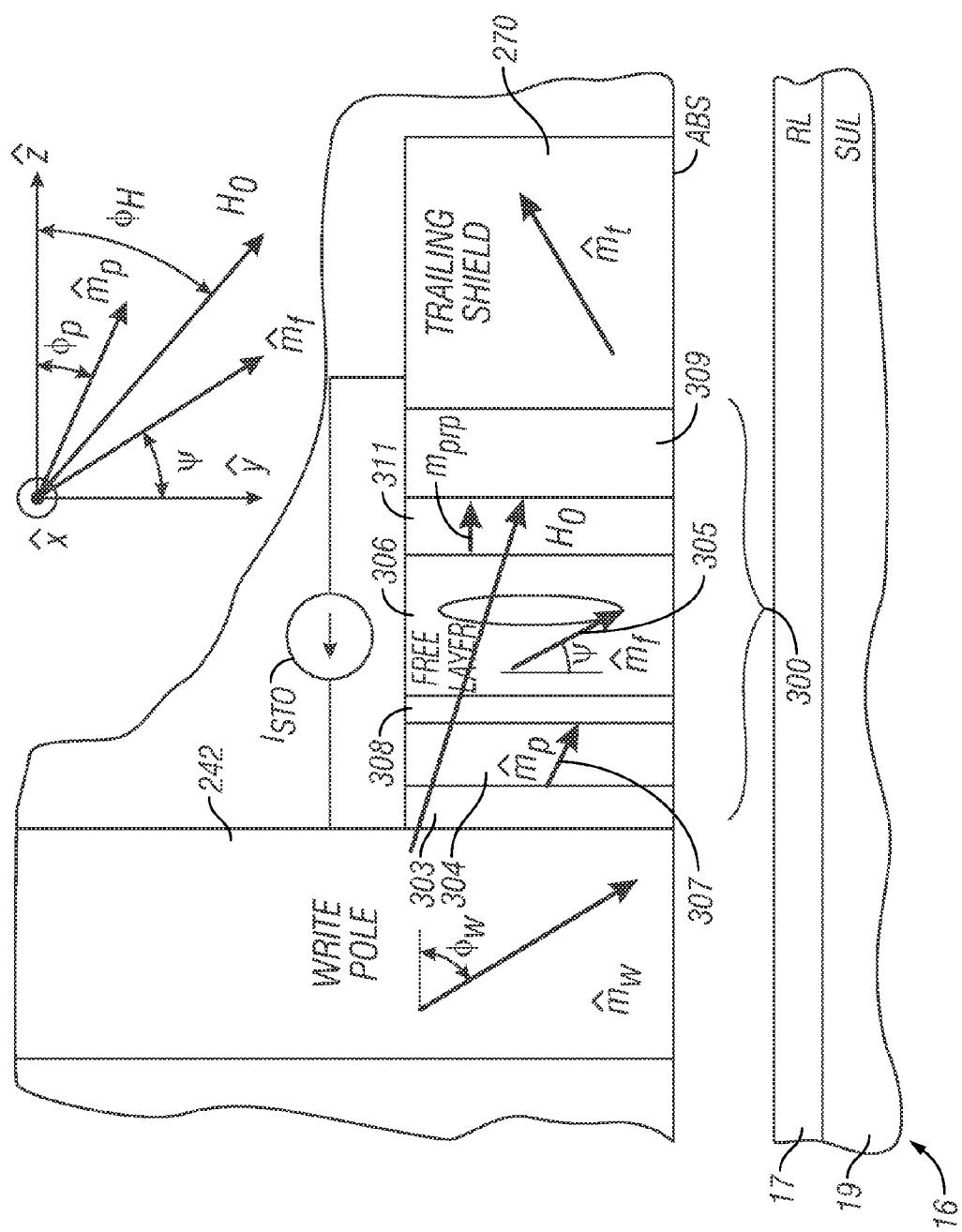
FIG. 10 shows an embodiment of the invention like that of FIG. 7A but with an additional perpendicular layer.

FIG. 9 shows yet another embodiment of the invention. This embodiment is substantially identical to the embodiment of FIG. 8 but with an additional "perpendicular" layer 411 directly in contact with and strongly exchange coupled to the free layer 406. The layer 411, which has a magnetization $m_{prp}$ substantially perpendicular to the plane of the free layer 406, may be a multilayer with large perpendicular magnetic anisotropy, such as the CoPt multilayer described in reference to layer 204 in FIG. 3A of the prior art. The purpose of perpendicular layer 411 is to provide an additional local effective field on the free layer 406 to increase its oscillation frequency $f$ beyond that achievable as limited by the magnitude of $H_0$. FIG. 10 shows an embodiment of the invention that is substantially identical to the embodiment of FIG. 7A but wherein the additional "perpendicular" layer 311 (like layer 411 in the embodiment of FIG. 9) is directly in contact with and strongly exchange coupled to the free layer 306.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A microwave-assisted magnetic recording (MAMR) write head for magnetizing regions in a perpendicular magnetic recording layer, the write head comprising:
   a write pole;
   an electrically conductive coil coupled to the write pole, the write pole generating a magnetic write field in the presence of electrical write current through the coil;
   a trailing shield of magnetically permeable material for altering the angle of the write field; and
   a spin torque oscillator (STO) between the write pole and the trailing shield and comprising a ferromagnetic polarizer, a free ferromagnetic layer having a magnetization that rotationally oscillates in the presence of an electrical current through the free layer to thereby generate an oscillating magnetic field to assist the magnetic field from the write pole, and a nonmagnetic electrically conductive spacer between the polarizer and free layer, the polarizer having a magnetization, in the presence of the write field from the write pole, oriented at an angle greater than 20 degrees and less than 80 degrees from the normal to the plane parallel to the free layer.

2. The head of claim 1 wherein the polarizer is a ferromagnetic polarizer layer having a magnetization, in the presence of the write field from the write pole, oriented at an angle greater than 30 degrees and less than 70 degrees from the normal to the plane of the polarizer layer.

3. The head of claim 1 wherein the polarizer is a ferromagnetic polarizer layer having a net in-plane magnetostatic shape anisotropy greater than 5 kOe.

4. The head of claim 3 wherein the polarizer is a ferromagnetic polarizer layer wherein the ratio of largest lateral in-plane dimension to thickness for the polarizer layer is between 5 and 15.

5. The head of claim 3 wherein the polarizer is a ferromagnetic polarizer layer formed of one or more of Co, Ni and Fe and has a saturation magnetization $M_s$ greater than 1500 emu/cc and less than 1800 emu/cc.

6. The head of claim 1 wherein the polarizer is a ferromagnetic polarizer layer located between the write pole and the free layer.

7. The head of claim 1 wherein the polarizer is a ferromagnetic polarizer layer located between the free layer and the trailing shield.

8. The head of claim 1 wherein the polarizer is a ferromagnetic polarizer layer exchange coupled to the write pole.

9. The head of claim 1 wherein the polarizer is a ferromagnetic polarizer layer exchange coupled to the trailing shield.

10. The head of claim 1 wherein the polarizer is the write pole, the magnetization near the surface of the write pole adjacent to the free layer when the write pole is fully magnetized being oriented at an angle greater than 20 degrees and less than 80 degrees from the normal to the plane parallel to the free layer.

11. The head of claim 1 wherein the polarizer is the trailing shield.

12. The head of claim 1 further comprising a ferromagnetic layer exchange coupled to the free layer and having a magnetization substantially perpendicular to the plane of the free layer.

13. The head of claim 1 wherein the STO further comprises two electrodes for the passage of electrical current.

14. The head of claim 13 wherein the write pole comprises a first of said two electrodes and the trailing shield comprises the second of said two electrodes.

15. The head of claim 13 further comprising:
   circuitry coupled to the two electrodes of the STO and capable of supplying direct current to the STO when write current is supplied to the coil.

16. A MAMR system comprising:
   the write head of claim 1; and
   a magnetic recording medium having a perpendicular magnetic recording layer.

17. A magnetic recording disk drive perpendicular recording write head for magnetizing regions in data tracks of a perpendicular magnetic recording layer on the disk, the head being formed on a slider having an air-bearing surface (ABS) lying substantially in a plane parallel to the X-Z plane of an X-Y-Z coordinate system and comprising:
   a substrate;
   a write pole on the substrate and aligned generally parallel to the Y-axis, the write pole having an end substantially at the ABS;
   an electrically conductive coil coupled to the write pole, the write pole generating a magnetic write field in the presence of electrical write current through the coil;
   a trailing shield on the substrate and formed of magnetically permeable material for altering the angle of the write field, the trailing shield being spaced from the write pole along the Z-axis;
   a spin torque oscillator (STO) on the substrate between the write pole and the trailing shield and comprising a stack of layers with planes generally parallel with the X-Y plane, said stack including a ferromagnetic polarizer layer having a magnetization, in the presence of the write field from the write pole, oriented at an angle $\phi_p$ between 20 degrees and 80 degrees from the Z-axis, a free ferromagnetic layer having a magnetization oriented at a non-zero angle ψ to the Z-axis and free to rotate about the Z-axis in the presence of electrical current through the free layer, and a nonmagnetic electrically conductive spacer between the polarizer layer and the free layer; and circuitry coupled to the STO and capable of supplying direct current through the stack when write current is supplied to the coil.

18. The head of claim 17 further comprising a first electrode between the STO and the write pole and a second electrode between the STO and the trailing shield and wherein said circuitry is coupled to the first and second electrodes.

19. The head of claim 17 wherein said circuitry is coupled to the write pole and the trailing shield.

20. The head of claim 17 wherein the polarizer layer has a magnetization, in the presence of the write field from the write pole, oriented at an angle greater than 30 degrees and less than 70 degrees from the Z-axis.

21. The head of claim 17 wherein the polarizer layer has a net in-plane magnetostatic shape anisotropy greater than 5 kOe.

22. The head of claim 17 wherein the polarizer layer is located between the write pole and the free layer.

23. The head of claim 17 wherein the polarizer layer is located between the free layer and the trailing shield.

24. The head of claim 17 wherein the polarizer layer is exchange coupled to the write pole.

25. The head of claim 17 wherein the polarizer layer is exchange coupled to the trailing shield.

26. The head of claim 17 further comprising a ferromagnetic layer exchange coupled to the free layer and having a magnetization substantially perpendicular to the plane of the free layer.

27. A microwave-assisted magnetic recording (MAMR) system comprising:
 the write head of claim 17; and
 a magnetic recording disk maintained near the write head and having a perpendicular magnetic recording layer oriented generally parallel to the ABS of the write head.

* * * * *